US010873266B2

(12) United States Patent
Stark

(10) Patent No.: US 10,873,266 B2
(45) Date of Patent: Dec. 22, 2020

(54) CONVERTER SYSTEM HAVING AN AC/DC CONVERTER, AND METHOD FOR OPERATING A CONVERTER SYSTEM

(71) Applicant: SEW-EURODRIVE GMBH & CO. KG, Bruchsal (DE)

(72) Inventor: Marcel Stark, Meckesheim (DE)

(73) Assignee: SEW-Eurodrive GmBH & Co., KG, Bruchsal (DE)

(*) Notice: Subject to any disclaimer, the term of this patent is extended or adjusted under 35 U.S.C. 154(b) by 346 days.

(21) Appl. No.: 16/301,335

(22) PCT Filed: May 3, 2017

(86) PCT No.: PCT/EP2017/025102
§ 371 (c)(1),
(2) Date: Nov. 13, 2018

(87) PCT Pub. No.: WO2017/194196
PCT Pub. Date: Nov. 16, 2017

(65) Prior Publication Data
US 2019/0199231 A1 Jun. 27, 2019

(30) Foreign Application Priority Data
May 13, 2016 (DE) .......... 10 2016 005 795

(51) Int. Cl.
H02M 5/42 (2006.01)
H02P 3/22 (2006.01)
(Continued)

(52) U.S. Cl.
CPC ............ H02M 5/42 (2013.01); B60L 7/02 (2013.01); H02M 1/08 (2013.01); H02M 5/4585 (2013.01);
(Continued)

(58) Field of Classification Search
CPC .......... H02M 1/08; H02M 1/088; H02M 5/42; H02M 5/458; H02M 5/4585;
(Continued)

(56) References Cited

U.S. PATENT DOCUMENTS 5,574,632 A * 11/1996 Pansier ................. H02H 9/001
363/49
5,814,954 A 9/1998 Suzuki et al.
(Continued)

FOREIGN PATENT DOCUMENTS

DE 102007018829 A1 11/2008
DE 69635765 T2 10/2016
(Continued)

OTHER PUBLICATIONS

International Search Report dated Jul. 31, 2017, in International Application No. PCT/EP2017/025102 (English-language translation).

(Continued)

Primary Examiner — Matthew V Nguyen
(74) Attorney, Agent, or Firm — Carter DeLuca & Farrell LLP

(57) ABSTRACT

In a converter system having an AC/DC converter, and a method for operating a converter system, in which the terminal of the AC/DC converter on the direct-voltage side feeds a series circuit, which has a braking resistor and a controllable switch, the terminal of a DC/AC converter, on the direct-voltage side being connected in parallel to the series circuit. The output signal of a voltage-acquisition device is supplied to an evaluation unit, which generates a control signal for the controllable switch. The evaluation unit includes a device for determining the electric power supplied to the braking resistor. The output signal of the device is supplied to a controller, and the controller controls (Continued)

its set value toward the output signal of the device. The controller in particular has a linear controller element whose set value is forwarded to a difference generator for determining the difference between the set value and the value of the electric power, the set value being supplied, directly or via a limiter, to a parameterizable filter.

16 Claims, 6 Drawing Sheets

(51) Int. Cl.
*H02P 29/68* (2016.01)
*B60L 7/02* (2006.01)
*H02M 5/458* (2006.01)
*H02M 7/53* (2006.01)
*H02M 1/08* (2006.01)
*H02P 27/06* (2006.01)
*H02M 1/32* (2007.01)
*H02H 6/00* (2006.01)
*H02H 5/04* (2006.01)

(52) U.S. Cl.
CPC ............... *H02M 7/53* (2013.01); *H02P 3/22* (2013.01); *H02P 27/06* (2013.01); *H02P 29/68* (2016.02); *H02H 5/04* (2013.01); *H02H 6/00* (2013.01); *H02M 2001/322* (2013.01); *H02M 2001/327* (2013.01); *Y02T 10/64* (2013.01)

(58) Field of Classification Search
CPC ...... H02M 2001/322; H02M 2001/327; H02P 3/22; H02P 27/06; H02P 29/68; B60L 7/02; H02H 5/04; H02H 6/00; Y02T 10/64; Y02T 10/642
See application file for complete search history.

(56) References Cited

U.S. PATENT DOCUMENTS

| 9,577,564 | B2* | 2/2017 | Schiffmann ............ H02P 27/06 |
| 2014/0070751 | A1 | 3/2014 | Niwa et al. |
| 2014/0191693 | A1 | 7/2014 | Funaba et al. |

FOREIGN PATENT DOCUMENTS

| EP | 2787219 A2 | 10/2014 |
| EP | 2797219 A2 | 10/2014 |
| JP | H10225158 A | 8/1998 |
| JP | 2003333873 A | 11/2003 |
| WO | WO 2011104285 A1 | 9/2011 |

OTHER PUBLICATIONS

International Preliminary Report on Patentability issued in International Patent Application No. PCT/EP2017/025102, dated Nov. 13, 2018 (9 pages).

* cited by examiner

CONVERTER SYSTEM HAVING AN AC/DC CONVERTER, AND METHOD FOR OPERATING A CONVERTER SYSTEM

FIELD OF THE INVENTION

The present invention relates to a converter system having an AC/DC converter, and to a method for operating a converter system.

BACKGROUND INFORMATION

Certain conventional converters include a rectifier, which is supplied from a power grid and feeds an inverter.

SUMMARY

Example embodiments of the present invention provide a converter system with the goal of improving the safety.

According to an example embodiment of the present invention, a converter system includes an AC/DC converter, in particular a rectifier, whose DC voltage-side terminal supplies a series circuit which has a braking resistor and a controllable switch, the DC voltage-side terminal of a DC/AC converter, especially an inverter, being connected in parallel to the series circuit, in particular, the output signal of a voltage-acquisition device being supplied to an evaluation unit, which generates a control signal for the controllable switch, the evaluation unit including a device for determining the electric power supplied to the braking resistor, in particular supplied from the intermediate circuit, which in particular is determined by the device from the output signal of the voltage-acquisition device, the output signal of the device being supplied to a controller, in particular a linear controller, and the controller controlling its set value toward the output signal of the device, the controller in particular having a linear controller element, in particular a PI controller element or integrator element, whose set value, i.e. whose output signal, is supplied to a difference generator for determining the difference between the set value and the value of the electric power, the set value being supplied, directly or via a limiter, to a parameterizable filter whose output signal is supplied to a switching element, which in particular generates an output signal for the opening or closing of the controllable switch as a function of an exceeding or undershooting of a threshold value.

This has the advantage of enhancing the safety since the temperature characteristic at the braking resistor is modeled with the aid of the controller including a downstream parameterizable filter. A shutdown is therefore able to take place when a threshold value of a temperature is exceeded. The modeling has a very uncomplicated configuration. The acquired value of the current in the intermediate circuit or of the voltage in the intermediate circuit is squared and subjected to an integration, and the result is supplied to a parameterizable filter. Thus, the modeling is arranged such that, at least in terms of quality, the output signal follows the real temperature value at the braking resistor. This makes it possible to dispense with a direct measurement of the temperature at the braking resistor. The integration takes place only for the particular period of time when the switch is closed.

The AC/DC converter may be arranged as a controllable rectifier. This is considered advantageous inasmuch as it is easy to prevent the supply of electric power.

In order to determine the electric power supplied to the braking resistor, the output signal may be forwarded to a squaring device for the time period of the closed state of the controllable switch, whose output signal is conveyed to a device for a multiplication by a resistance value of the braking resistor. This offers the advantage that it is very easy to determine the electric power from the acquired voltage.

In order to determine the electric power supplied to the braking resistor, the output signal of the voltage-acquisition device or the output signal of a current-acquisition device which detects the current flowing in the intermediate circuit may be supplied for the duration of the closed state of the controllable switch to a device whose output signal corresponds to the product of the output signals of the voltage-acquisition device and the current-acquisition device, or in other words, to the electric power, in particular. This is considered advantageous insofar as the electric power is able to be determined by multiplying the intermediate-circuit voltage and the intermediate-circuit current or by squaring the intermediate-circuit current and multiplying it by the associated resistance value, or by squaring the intermediate-circuit voltage and dividing it by the associated resistance value.

The signal representing the electric power may vanish for the duration of the open state of the controllable switch, and thus has the zero value, in particular. This has the advantage that the integration of the power is the energy introduced into the braking resistor.

A galvanically decoupled current-acquisition device, in particular an optocoupler, may be disposed in the series circuit, whose output signal is supplied to the evaluation unit, a comparison device of the evaluation unit monitoring the output signal with regard to impermissibly high deviations from the time characteristic of the control signal provided for the controllable switch, and displaying, reporting and forwarding a warning or a fault status as a function thereof. This has the advantage of achieving greater security in that the control signal is able to be compared to the acquired current signal. Via the feedback signal, it is possible to detect whether an internal or an external resistor is present.

According to an example embodiment of the present invention, in a method for operating a converter system, a series circuit, which includes a controllable switch and a braking resistor, is connected at the terminal of an AC/DC converter on the direct voltage side, and parallel thereto, the terminal of a DC/AC converter on the direct voltage side, and the electric power supplied to the braking resistor when the controllable switch is closed is determined from the voltage acquired at the terminal of the DC/AC converter or the AC/DC converter on the direct voltage side, the electric power supplied to the braking resistor vanishing when the controllable switch is open, the time characteristic of the electric power dissipated to the braking resistor is supplied to a controller, in particular a linear controller, which regulates its set value, i.e. especially its output signal, to the time characteristic of the electric power dissipated to the braking resistor, the set value of the controller is conveyed, directly or via a limiter, to a parameterizable filter whose output signal is supplied to a switching element, which controls the controllable switch, in particular as a function of the exceeding or undershooting of a threshold value by the set value.

This has the advantage that simple monitoring with regard to an over-temperature of the braking resistor is able to be carried out in that the temperature characteristic is modeled, and no direct detection is required.

The control signal generated by the switching element may be compared for impermissibly high deviations from the feedback signal detected in the series circuit, in particular in the braking resistor. This has the advantage that simple monitoring may be carried out. For example, short-circuiting by alloying or the use of an internal or external braking resistor is able to be detected.

The filter may be parameterized such that the time characteristic of the output signal corresponds to the actual temperature characteristic. This has the advantage that the temperature characteristic may be monitored without any direct temperature detection at the braking resistor.

Further features and aspects of example embodiments of the present invention are described in greater detail below with reference to the appended Figures.

DETAILED DESCRIPTION

Figure 1:
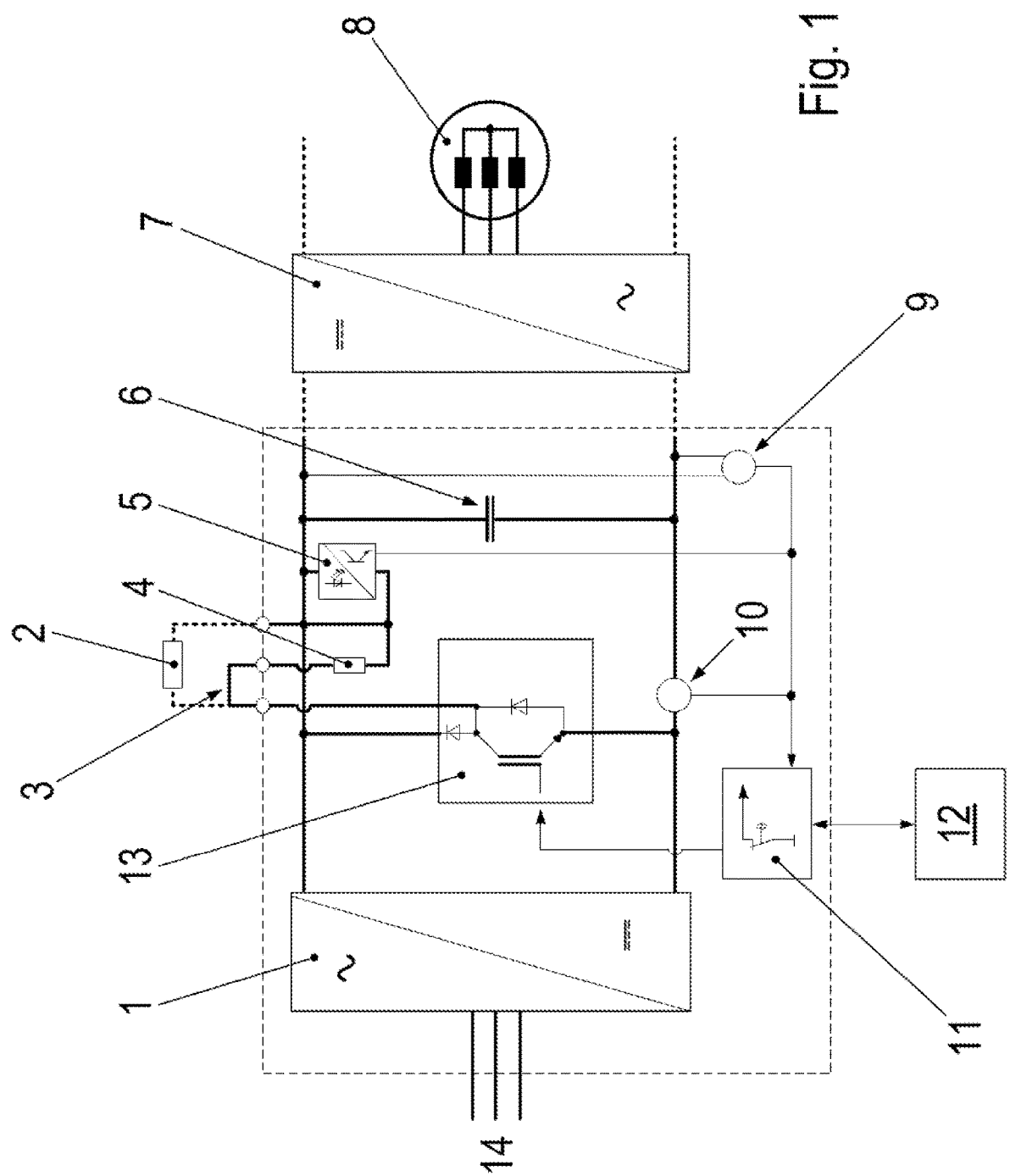
FIG. 1 shows a first converter system according to an example embodiment of the present invention for the supply of an electric motor 8, where a controllable switch 13 and braking resistor (2, 4) are disposed in the converter system.

As illustrated in FIG. 1, at its terminal on the alternating voltage side, the converter system has an AC/DC converter 1, in particular a controllable rectifier or an inverter, which is able to be supplied via an alternating-voltage supply network 14. As a result, electric energy withdrawn from alternating-voltage supply network 14 is able to be supplied in the form of a direct voltage, i.e. an intermediate-circuit voltage, at the terminal of AC/DC converter 1 on the direct voltage side.

A capacitance 6, in particular an intermediate-circuit capacitor, is connected to this terminal on the direct voltage side, and parallel thereto, an inverter 7, in particular a DC/AC converter or regenerative DC/AC converter, and a series circuit, which has a controllable switch 13 and a braking resistor. AC/DC converter 1 and inverter 7 are situated inside a shared housing and thus are arranged as a converter.

An internal braking resistor 4, i.e. a braking resistor situated inside the housing of the converter, acts as a braking resistor when a bridge 3 is appropriately electrically connected at terminals of the converter, or in other words, when it electrically connects two contacts of the converter and thus connects internal braking resistor 4 by its first terminal to a potential of the intermediate-circuit voltage and the other terminal of internal braking resistor 4 to a terminal of controllable switch 13.

Parallel to internal braking resistor 4, an external braking resistor 2 is also via its first terminal to the potential of the intermediate-circuit voltage, and via its other terminal, to the other terminal of internal braking resistor 4.

Parallel to the braking resistor, an illumination device of an optocoupler is controlled with the aid of the controllable switch. This illumination device controls a light-sensitive switch, in particular a phototransistor, for the potential separation. The sensor signal induced in this manner is supplied to an evaluation unit 11, which calculates a temperature model for the internal or external braking resistor, and/or which also generates or enables control signals 41 for controllable switch 13. In other words, when evaluation unit 11 sends a control signal 41 to controllable switch 13 and the sensor signal does not follow control signal 41 within a predefined time window, then an error status will be reported.

According to FIG. 1, the value of the intermediate-circuit voltage acquired by a voltage-acquisition device 9 and the value of the current flowing in the intermediate circuit acquired by a current-acquisition device 10 are supplied to evaluation unit 11 in addition. When the intermediate-circuit voltage exceeds a threshold value, evaluation unit 11 is thus able to generate a control signal to the effect that switch 13 is closed and energy is therefore dissipated from the intermediate circuit to the braking resistor. This makes it possible to prevent a further, possibly dangerous rise in the intermediate-circuit voltage. As an alternative, in the example embodiment illustrated in FIG. 2, only the value acquired by voltage-acquisition device 9 is supplied to evaluation unit 11.

Figure 2:
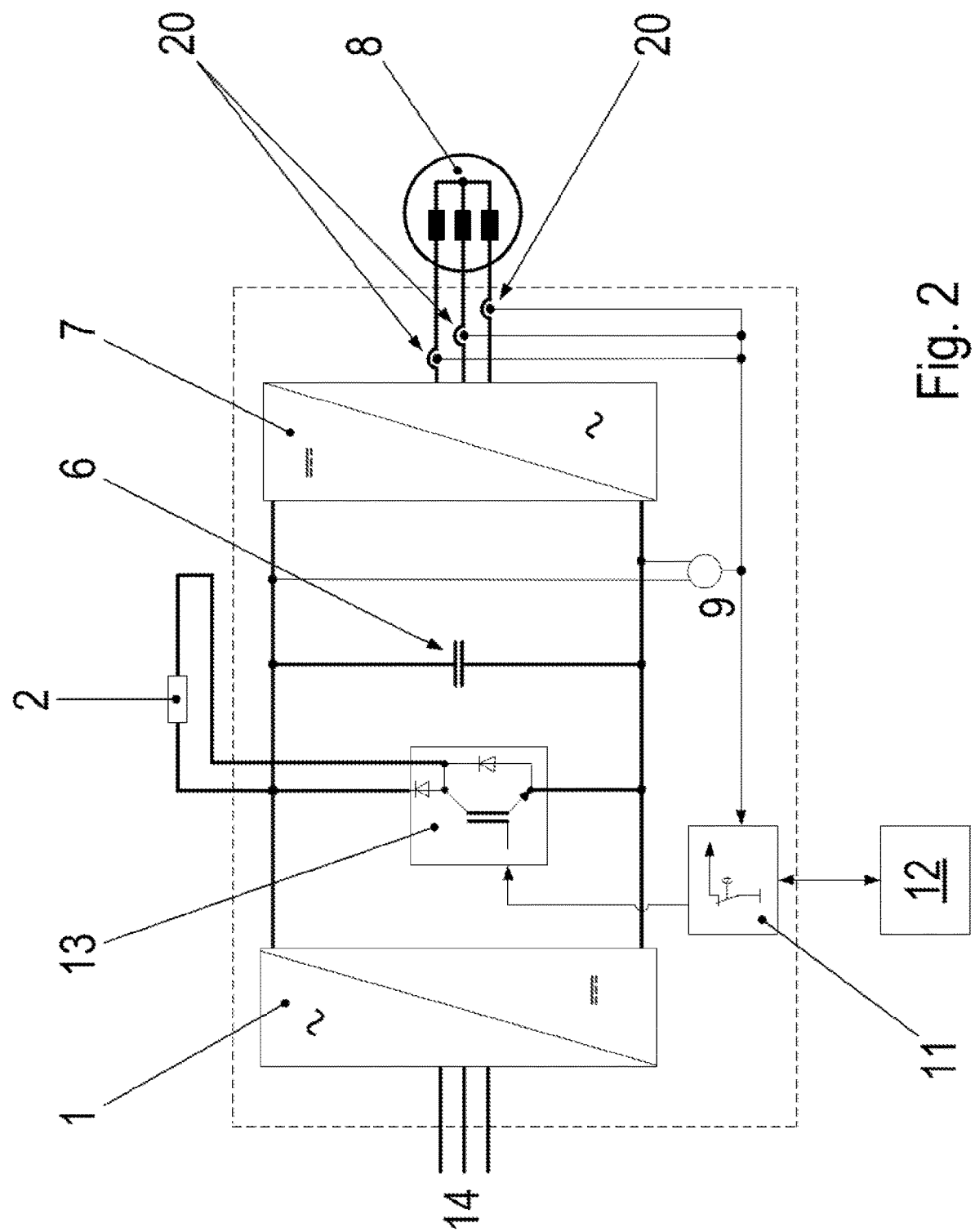
FIG. 2 shows a second converter system according to an example embodiment of the present invention, which includes a controllable switch 13 and braking resistor 2.

As illustrated in FIGS. 1 and 2, evaluation unit 11 compares the signal fed back by optocoupler 5 to the generated control signal and in the event of an impermissible deviation, for which a time offset, in particular, is taken into account as well, an error status is reported. For example, fusing of switch 13 by alloying is able to be detected or a cut electrical line.

Whether or not an external braking resistor 2 is electrically connected is detected by generating a test pulse and then monitoring and evaluating the current characteristic. If the test pulse induces closing of switch 13 for a period of time in the process, then the current rises according to a time characteristic defined by the value of the braking resistor. The existence of an external braking resistor is detectable in this manner.

Furthermore, the time characteristic of the temperature of the braking resistor is modeled in evaluation unit 11. According to FIG. 1, for such modeling, either the value of the acquired intermediate circuit voltage is multiplied by the value of the acquired current in the intermediate circuit in order to obtain the respective instantaneous electric power P(t) during the particular time period when switch 13 is open, or according to FIG. 2, the acquired intermediate-circuit voltage applied at the braking resistor during the time period of closed switch 13 is used to determine the electric power $P(t)=U(t)*U(t)/R$, where voltage U(t) is the intermediate-circuit voltage applied at the braking resistor at the Ohmic value R at the respective instant t of the time period.

The heat quantity introduced into the braking resistor is determined with the aid of a temporal integration of electric power P(t) determined in this manner, i.e. according to FIG. 1 or FIG. 2.

Figure 5:
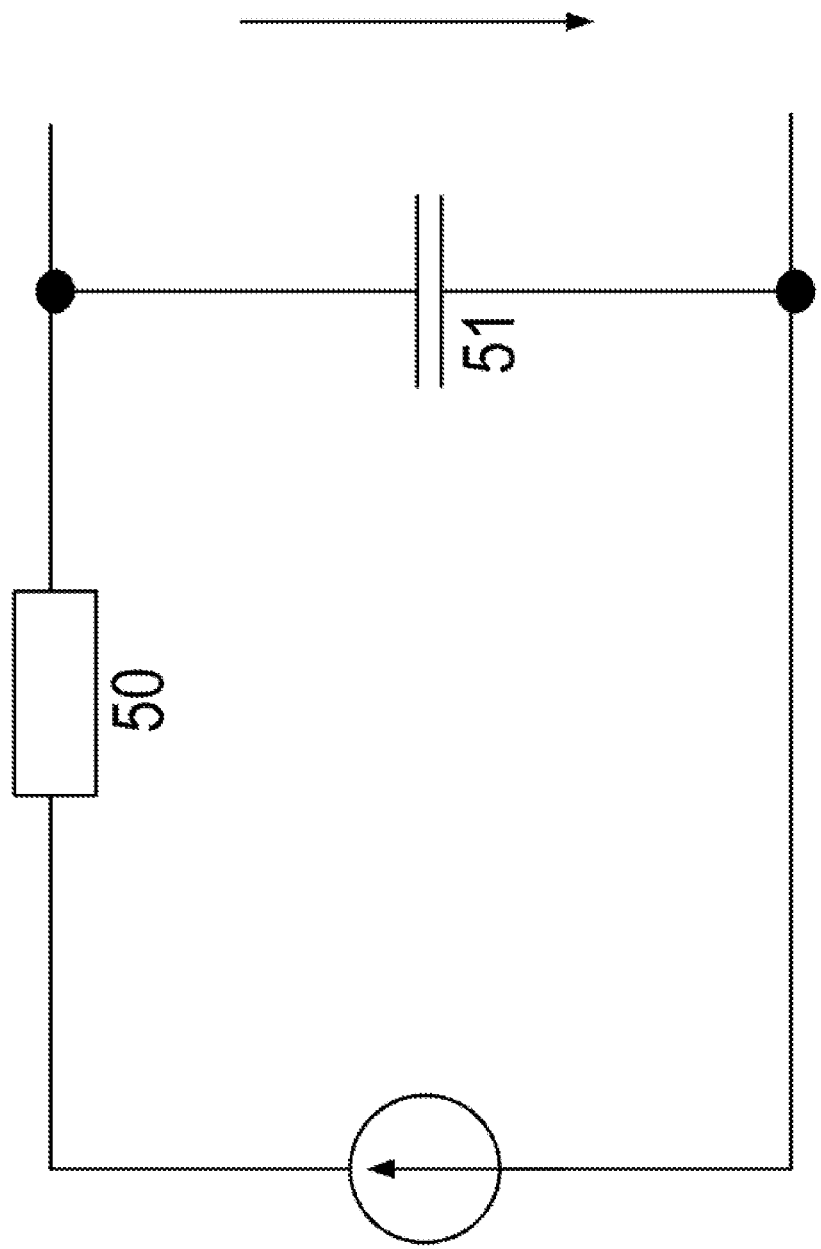
FIG. 5 illustrates a schematic circuit diagram for the heat conduction, which forms the basis of the modeling.

The thermal circuit diagram shown in FIG. 5 forms the basis of the modeling of the temperature characteristic in evaluation unit 11. Thermal capacity 51 is thus taken into account and also thermal resistivity 50 from the braking resistor to the environment.

Figure 6:
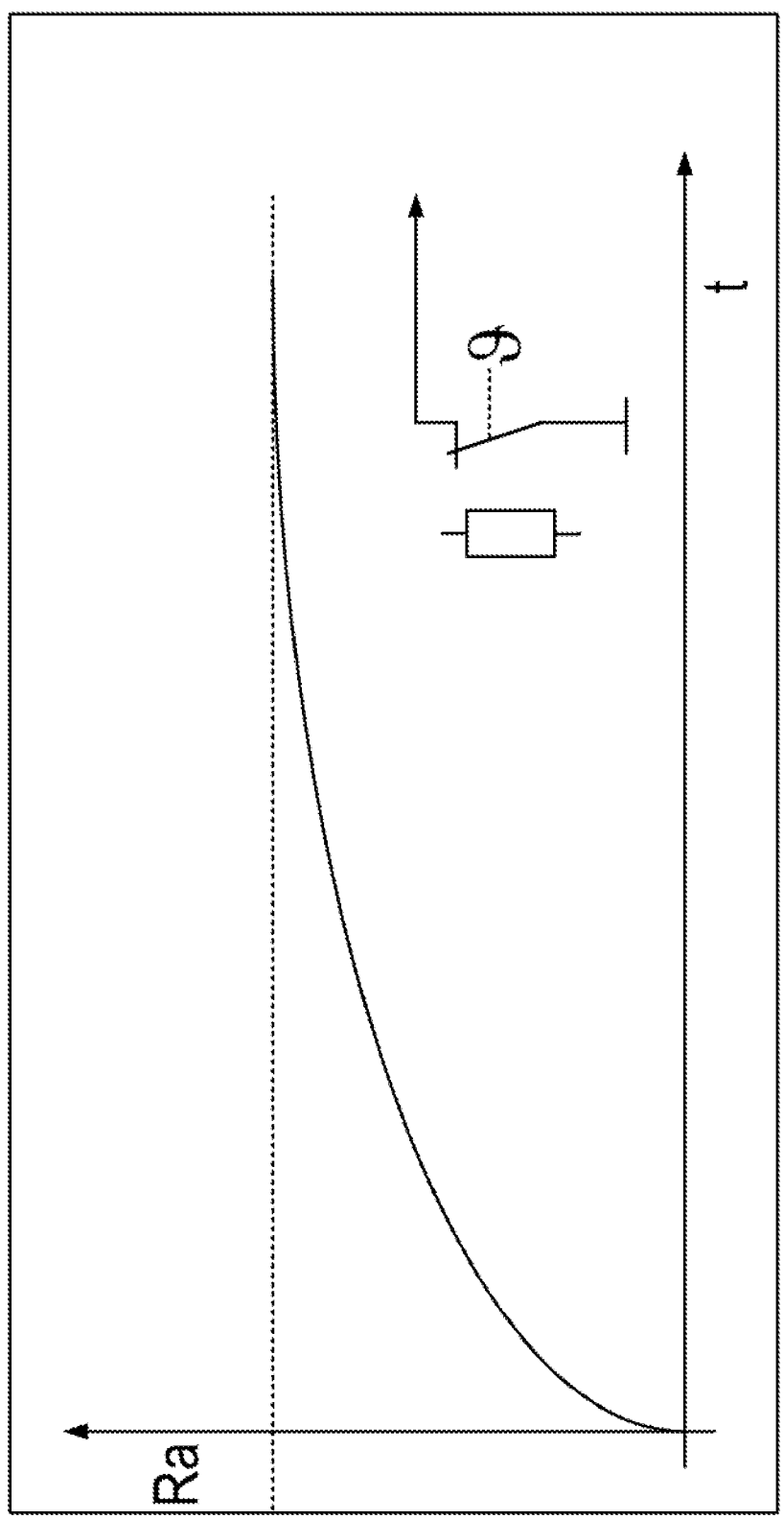
FIG. 6 shows an exemplary temperature characteristic, where controllable switch 13 is permanently activated at instant t=0 and the temperature of braking resistor 4 thus converges to temperature value 43 during a continuous-running operation.

FIG. 6 shows a typical temperature characteristic during the closing of switch 13.

Figure 3:
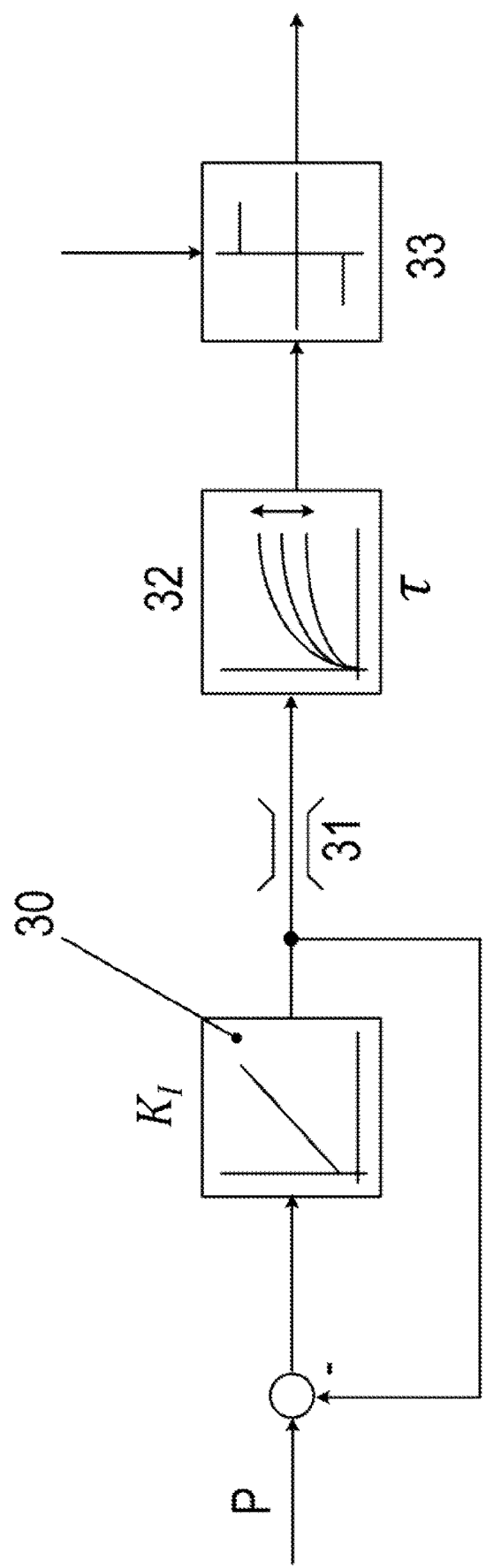
FIG. 3 schematically illustrates the modeling of the temperature of the braking resistor (2, 4).

As illustrated in FIG. 3, determined electric power P(t) is conveyed to a linear controller, and the difference between the set value of a linear controller element 30 and the instantaneously determined electric power P(t) is conveyed to linear controller element 30.

The linear controller element has at least one controller element that includes an integrator.

The set value, i.e. the output signal of linear controller element 30, is forwarded via a limiter 31 to a parameterizable filter 32, which models the dissipation of the heat into the environment. The parameterization of filter 32 is carried out such that the characteristic of the output signal of filter 32 corresponds to the temperature characteristic at the braking resistor. Switching element 33 generates the control signal for switch 13 as a function of the exceeding or undershooting of a threshold value. A switching hysteresis is taken into account in this context.

Figure 4:
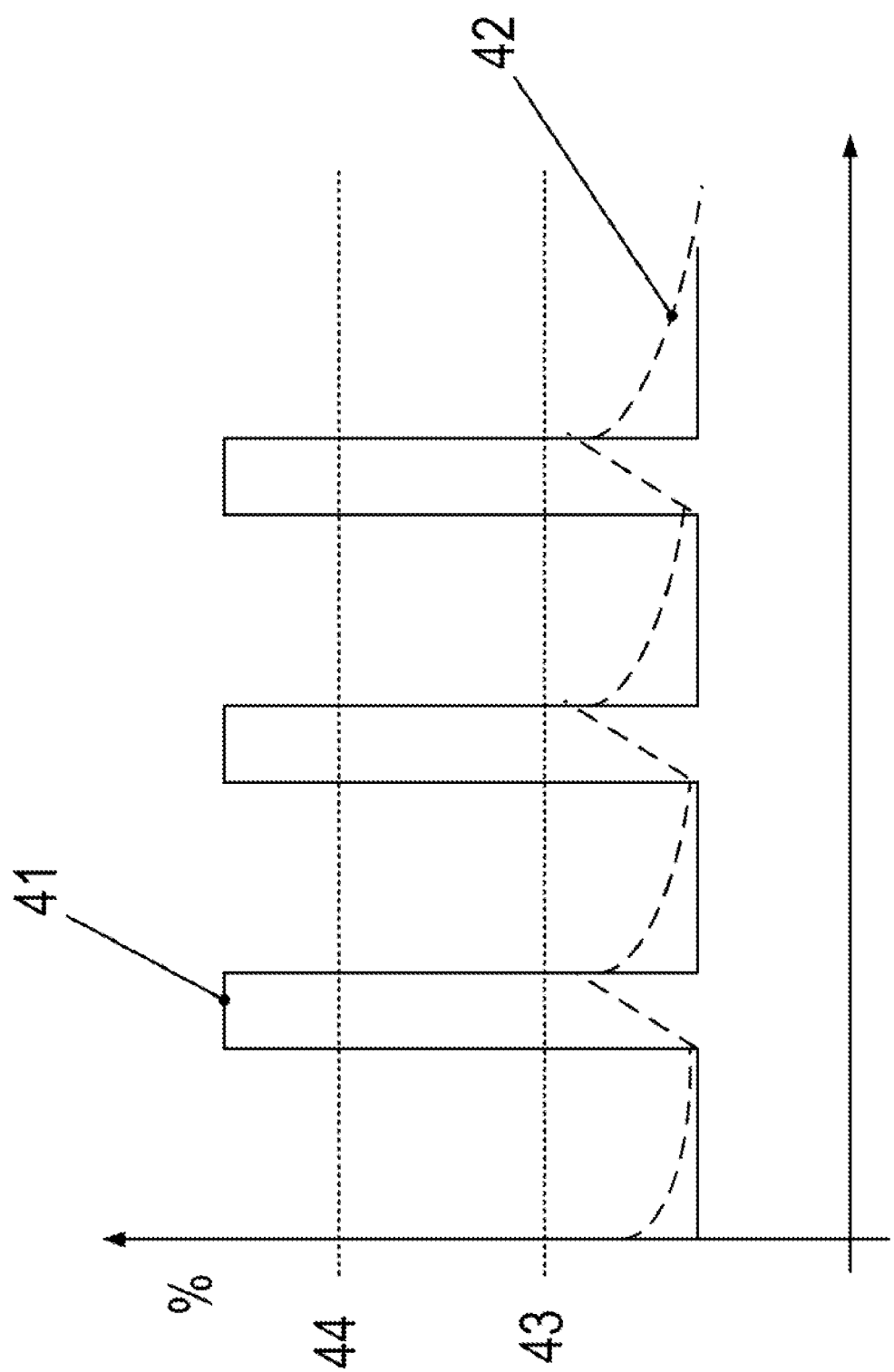
FIG. 4 shows exemplary signal characteristics and associated threshold values.

As illustrated in FIG. 4, modeled temperature signal 42 has a characteristic that depends on control signal 41 for controllable switch 13. The temperature rises during the time periods when the switch is closed, and it drops in the other case.

If switch 13 is permanently closed, temperature value 43 would come about when the average power supplied to the braking resistor corresponds to the rating-plate value, or in other words, to the norm specification for a continuous-running operation.

However, if the temperature rises beyond threshold value 44 when high electric powers are dissipated, then an error status will be reported and/or displayed by the converter system. In addition, switch 13 is then opened in order to protect the braking resistor.

Evaluation unit 11 is able to be parameterized with the aid of a communications interface 12, in particular an HMI interface. The parameters, in particular the parameters that define time constant τ of parameterizable filter 32, are able to be input. Filter 32 is, for example a PT1-filter, i.e. a low pass filter.

LIST OF REFERENCE CHARACTERS

1 AC/DC-converter, in particular a controllable rectifier or inverter
2 external braking resistor
3 bridge, in particular short-circuit bridge
4 internal braking resistor
5 optocoupler
6 capacitance, in particular intermediate-circuit capacitor
7 inverter, in particular DC/AC converter or regenerative DC/AC converter
8 electric motor
9 voltage-acquisition device
10 current-acquisition device
11 evaluation unit
12 communications interface, in particular HMI interface
13 controllable switch, in particular circuit breaker
14 alternating-voltage supply network
20 current-acquisition device
30 linear controller element, in particular a controller element including integrator
31 limiter
32 parameterizable filter
33 switching element
41 control signal for controllable switch
42 temperature signal
43 temperature value in a continuous-running operation
44 threshold value for temperature signal
50 thermal conductivity resistance
51 thermal capacity
P power
K I constant of proportionality
τ time constant (tau)

The invention claimed is:

1. A converter system, comprising:
an AC/DC converter;
a series circuit including a braking resistor and a controllable switch connected to a terminal on a direct-voltage side of the AC/DC converter; a DC/AC converter, a terminal on a direct-voltage side of the DC/AC converter connected in parallel to the series circuit;
an evaluation unit adapted to generate a control signal for the controllable switch and including a determination device adapted to determine electric power supplied to the braking resistor;
a voltage-acquisition device adapted to supply an output signal to the evaluation unit; and
a controller, the determination device adapted to supply an output signal to the controller, the controller adapted to regulate a set value toward the output signal of the determination device, the controller adapted to supply, directly and/or via a limiter, to a parameterizable filter adapted to convey an output signal to a switching element, the switching element adapted to generate an output signal to open and/or close the controllable switch as a function of exceeding and/or undershooting of a threshold value.

2. The converter system according to claim 1, wherein the AC/DC converter includes a rectifier and/or a controllable rectifier, and/or wherein the DC/AC converter includes an inverter.

3. The converter system according to claim 1, wherein the determination device is adapted to determine the electric power supplied to the braking resistor from an intermediate circuit.

4. The converter system according to claim 1, wherein the determination device is adapted to determine the electric power supplied to the braking resistor from an output signal of the voltage-acquisition device.

5. The converter system according to claim 1, wherein the controller is arranged as a linear controller.

6. The converter system according to claim 1, wherein the controller includes a linear controller element, a PI controller element, and/or integration element adapted to supply a set value and/or an output signal to a difference generator to determine a difference between (a) the set value and/or the output signal and (b) a value of the electric power.

7. The converter system according to claim 1, wherein the AC/DC converter includes a controllable rectifier.

8. The converter system according to claim 1, further comprising a squaring device, the determination device being adapted to determine the electric power supplied to the braking resistor by supplying an output signal to the squaring device for a time period of a closed state of the controllable switch and supplying an output signal of the squaring device to a multiplication device adapted to multiply the output signal of the squaring device by a resistance value of the braking resistor.

9. The converter system according to claim 1, wherein the determination is adapted to determine the electric power supplied to the braking resistor by supplying the output signal of the voltage-acquisition device and an output signal of a current-acquisition device, adapted to detect current flowing in the intermediate circuit, for a time period of a closed state of the controllable switch to a device adapted to generate an output signal that corresponds to a product of the output signals of the voltage-acquisition device and the current-acquisition device.

10. The converter system according to claim 1, wherein the signal representing the electric power vanishes and/or assumes a zero value for a time period of an open state of the controllable switch.

11. The converter system according to claim 1, wherein the series circuit includes a galvanically decoupled current-acquisition device and/or an optocoupler adapted to supply an output signal to the evaluation unit, a comparison device of the evaluation unit adapted to monitor the output signal for impermissibly high deviations from a time characteristic of the control signal provided for the controllable switch and to report and/or forward a warning and/or an error status as a function thereof.

12. A method for operating a converter system including a series circuit, having a controllable switch and a braking resistor, connected at a direct voltage-side terminal of an AC/DC converter, and parallel thereto, a direct voltage-side terminal of a DC/AC converter, comprising:

using a voltage acquired at the terminal of the DC/AC converter and/or the AC/DC converter on the direct voltage-side to determine electric power discharged to the braking resistor when the controllable switch is closed, and when the controllable switch is open, the electric power discharged to the braking resistor vanishes;

supplying a time characteristic of the electric power discharged to the braking resistor to a controller to control a set value toward the time characteristic of the electric power discharged to the braking resistor; and supplying the set value of the controller, directly or via a limiter, to a parameterizable filter supplying an output signal to a switching element that controls the controllable switch.

13. The method according to claim 12, wherein the controller is arranged as a linear controller.

14. The method according to claim 12, wherein the switching element controls the controllable switch as a function of exceeding and/or undershooting a threshold value by the set value.

15. The method according to claim 12, further comprising comparing the control signal generated by the switching element for impermissibly high deviations from a current characteristic detected in the series circuit and/or in the braking resistor.

16. The method according to claim 12, wherein the filter is parameterized such that the time characteristic of the output signal corresponds to a real temperature characteristic.

* * * * *